United States Patent
Kaminsky et al.

(10) Patent No.: US 6,583,936 B1
(45) Date of Patent: Jun. 24, 2003

(54) PATTERNED ROLLER FOR THE MICRO-REPLICATION OF COMPLEX LENSES

(75) Inventors: Cheryl J. Kaminsky, Rochester, NY (US); Robert P. Bourdelais, Pittsford, NY (US); Steven M. Pratt, Hilton, NY (US); Daniel C. Lioy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/094,979

(22) Filed: Mar. 11, 2002

(51) Int. Cl.⁷ .............................. G02B 27/10
(52) U.S. Cl. .................. 359/619; 359/707; 359/599
(58) Field of Search .................. 359/619, 620, 359/621, 622, 624, 625, 626, 628, 707, 455, 599; 322/20; 250/216

(56) References Cited

U.S. PATENT DOCUMENTS

| | | | |
|---|---|---|---|
| 4,508,749 A | * 4/1985 | Brannon et al. | 427/555 |
| 4,842,782 A | * 6/1989 | Portney et al. | 264/1.37 |
| 5,517,279 A | * 5/1996 | Hugle et al. | 355/46 |
| 6,124,974 A | 9/2000 | Burger | 359/621 |
| 6,241,903 B1 | 6/2001 | Savant et al. | 216/24 |
| 6,285,001 B1 | 9/2001 | Fleming et al. | 219/121.72 |

* cited by examiner

Primary Examiner—Ricky Mack
Assistant Examiner—Brandi Thomas
(74) Attorney, Agent, or Firm—Arthur E. Kluegel (57) ABSTRACT

Disclosed is a form comprising a surface having a morphology of complex lenses wherein the surface asperities have an amplitude of between 1 and 40 micrometers, a spatial frequency of between 1 and 100 complex lenses per square millimeter, and between 1 and 40 minor lenses per major lens. Also disclosed is a method for making such a form.

41 Claims, 1 Drawing Sheet

PATTERNED ROLLER FOR THE MICRO-REPLICATION OF COMPLEX LENSES

CROSS REFERENCE TO RELATED APPLICATIONS

This application is one of a group of seven applications co-filed Ser. Nos. 10/095,204, 10/095,601, 10/095,145, 10/095,172, 10/095,319, 10/094,977, and 10/094,979.

FIELD OF THE INVENTION

The invention relates to a form comprising a certain surface morphology of complex lenses useful for making a light diffuser and a method for making such a form.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need to for a separate film. In the case of light management in a LCD, this increases efficiency by removing an interface (which causes reflection and lost light).

U.S. Pat. No. 6,270697 (Meyers et al.), blur films are used to transmitted infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. While the materials disclosed in U.S. Pat. No. 6,266,476 shape and collimate light and therefore are not efficient diffusers of light particularly for liquid crystal display devices. Further, the micro structures in U.S. Pat. No. 6,266,476 are simple in nature and do not contain multiple diffusion surfaces.

U.S. Pat. No. 6,241,903 (Shie et al.) discloses a method of manufacture for a light diffusion master. The method comprises blasting with shot particles in order to form impressions. While the shot blasting does create a simple piano lens capable of diffusing light, the method in U.S. Pat. No. 6,241,903 does not utilize the chrome platting step which has been shown to create nodules that allow for the formation of complex lenses.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers. While the roller patterns are efficient for creating a rough surface to enhance web transport, the prior art roller surfaces are not efficient light diffusers as they typically feature one light diffusion surface.

The U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive. Additionally, the lithography surfaces described in U.S. Pat. No. 6,124,974 does not provide a complex curved surface for efficient light diffusion.

PROBLEM TO BE SOLVED BY THE INVENTION

There remains a need for an improved light diffusion of image illumination light sources to provide improved diffuse light transmission while simultaneously diffusing specular light sources.

SUMMARY OF THE INVENTION

The invention provides a light diffuser a form comprising a surface having a morphology of complex concave or convex lenses wherein the surface asperities have an amplitude of between 1 and 40 micrometers, a spatial frequency of between 1 and 100 complex lenses per square millimeter and between 1 and 40 minor lenses per major lens. The invention also provides a back lighted imaging media, a liquid crystal display component and device.

ADVANTAGEOUS EFFECT OF THE INVENTION

The invention provides a form useful for manufacturing light diffusers having improved light transmission while simultaneously diffusing specular light sources and a method of making the form.

DETAILED DESCRIPTION OF THE INVENTION

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The surface lenslet structure polymer layer of the invention can be easily changed to achieve the desired diffusion and light transmission requirements for many liquid crystal devices thus allowing the invention materials to be responsive to the rapidly changing product requirements in the liquid crystal display market.

The invention provides a method for manufacturing web based diffuser sheets for LCD. Web based diffusion sheets are lower in cost that molded diffuser sheets as the diffusion lens on the surface of the geometry can be formed continuously on a web material such as polyester. Further, the form, which can be used to create light diffusion sheets, can be used in a variety of manufacturing processes such as embossing, vacuum molding and melt extrusion of polymers. The form of the invention contains the negative of the desired lens geometry and therefore can be utilized to create a diffuser in any manufacturing process where a clear polymer material can flow to conform to the desired shape.

The form of the invention can be changed to provide several types of light diffusion. For example, the base lens of the invention can have a low aspect ratio yielding a focused light diffusion pattern which has value for LC devices with small viewing angles or can have a high aspect ratio for wide angle light diffusion for LC television. The form can be changed by the depth and size of the asperities on the form and by the amount development of chrome nodules, both of which have been shown to differentiated product.

The elastic modulus and scratch resistance of the light diffuser is improved over prior art cast coated polymer diffusers rendering a more robust diffuser during the assembly operation of the liquid crystal device. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y plane. The term "pattern" means any predetermined arrangement of lenses whether regular or random.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, microvoided polymer film, or coating the film with matte resins or beads. The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets in which the minor lenses are formed randomly on top of. "Minor lenses" mean lenses smaller than the major lenses that are formed on the major lens. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the inner surface of a sphere with the surface feature into the surface of the film. The term "convex" means curved as the exterior of a sphere with the surface feature out of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, or that the direction of the peak light transmission is not along the direction θ=0°, but is in a direction non-normal to the surface. There are least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

A form comprising a surface having a morphology of concave or convex complex lenses wherein the surface asperities have an amplitude of between 1 and 40 micrometers, a spatial frequency of between 1 and 100 complex lenses per square millimeter and between 1 and 40 minor lenses per major lens is preferred as a form to create visible light diffusion films. This form has been show to provide excellent visible light diffusion for LC devices, for example and allows a variety of manufacturing methods to be utilized. Further the combination of complex lenses with the desired amplitude, spatial frequency and number of minor lenses per major lens is critical to the function of the resulting light diffusion sheet.

A form where the complex lenses are randomly spaced is preferred because a random distribution of lenses allows for excellent light diffusion compared to prior art light diffuser sheets. The random complex pattern has also been shown to provide a desirable gausian distribution of light.

In another embodiment of the invention, the complex lenses are preferably ordered. A form containing ordered complex lenses has been shown to provide both light diffusion and light shaping. Light diffusion and light shaping have significant commercial value in display applications where viewing angle need to be improved such as a wave guided display, for example. Light shaping also can be used to better focus the light energy into LC displays prior to the polarizer sheets.

In another embodiment of the invention, a form that contains surface asperities of between 3 and 20 micrometers is preferred. Form asperities less than 0.8 micrometers are difficult to manufacture and have been shown to provide some undesirable optical interference patterns. Form asperities greater than 45 micrometers have been shown to result in an unacceptable level of specular light transmission, which can create undesirable viewing "hot spots". In another embodiment of the invention, a form that contains surface asperities with a spatial frequency of between 15 and 70 complex lenses features per square mm are preferred. Spatial frequency less than 1 lens per square mm has been shown to provide an unacceptable level of light diffusion. A spatial frequency greater than 110 complex lens features per square mm is difficult to manufacture and does not provide a significant improvement in visible light diffusion.

In another embodiment of the invention, a form that contains between 6 and 25 minor lenses per major lens is preferred. A form with less than 1 minor lens is just a curved lens and thus does not have additional surfaces from which the visible light is diffused. A form with greater than 45 minor lenses per major lens is difficult to manufacture. Further, as the number of minor lenses increases, the minor lenses will blend forming a uniform surface and thus the diffusion efficiency will decrease.

The form preferably comprises a metallic roller. A metallic roller is preferred as it can be used for embossing of hard polymers such as PMMA and acrylic, both of which have the required hardness for diffusion films that need scratch resistance such as front PDA diffuser sheets.

In another embodiment, the form preferably comprises a metallic chill roller. The chill roller allows for a melt cast polymer to take the complex lens shape of the form of the invention and cool the polymer below the Tg of the polymer. The chilled roller is efficiently used in combination with polyolefin and PET polymer lenses. An advantage to polyolefin lenses is the softness of the lens as they are combined with other scratch prone optical films such as polarizer sheets.

In another embodiment of the invention, the form preferably comprises a chrome platted roller. The chrome plating process provides nodules on the surface asperities. The chrome platting allows for the aspect ratio of the complex lens geometry to be changed and thus allows for customization of the light diffusion cone, for example, a wide complex lens yields a wide angle light diffusion cone. The chrome platting also provides protection to the precision geometry of the complex lens during manufacturing of the lenses.

In another embodiment, the form preferably comprises an polymer injection molding tool. By injection molding utilizing the form of the invention, the efficient light diffusion geometry of the complex lenses can be used in combination with high precision optical components such as camera lenses and precision wave guides. Utilizing the preferred injection molding form of the invention, the complex lenses are replicated at over 98% which allows for precision placement of the major and minor lenses. Utilization of the injection molding form has been show to produce a very efficient light diffuser compared to prior art light diffusers which typically utilize polymer beads coated in a matrix.

In another embodiment of the invention, the form preferably comprises a hot embossing roller. The hot embossing roller allows for the preferred complex lens geometry to be embossed in a variety of substrates by using heat and pressure. An example is vinyl, which as a resistance to temperature changes thus allow the vinyl diffuser to be used in extremes of ambient temperature.

In another embodiment of the invention the form preferably comprises a vacuum form. Vacuum forming can preferably be used to provide complex lens geometry to large web materials for large format displays. Further vacuum forming is low in cost and can be used on a variety of web materials and composite web materials.

A transparent polymeric film having a top and bottom surface comprising a plurality of convex or concave complex lenses on the surface of the transparent polymeric film is preferred. Curved concave and convex polymer lenses have been shown to provide very efficient diffusion of light. Further, the polymer lenses of the invention are transparent, allowing a high transmission of light allowing the brightness of LC displays to emit more light.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device.

In one embodiment of the invention, convex lenses are present on the top surface and convex lenses are present on the bottom surface of the transparent polymeric film. The placement of convex lenses on both sides of the polymer film creates stand off from other adjacent films providing the necessary air gap required for efficient diffusion by the lenses.

In another embodiment of the invention, convex lenses are present on the top surface and concave lenses are present on the bottom surface of the transparent polymeric film. The placement of convex lenses on the top side of the polymer film creates stand off from other adjacent films providing the necessary air gap required for efficient diffusion by the lenses. The placement of concave lenses on the bottom side of the polymer film creates a surface that can be in optical contact with the adjacent films and still effectively diffuse the light.

In another embodiment of the invention, concave lenses are present on the top surface and concave lenses are present on the bottom surface of the transparent polymeric film. The placement of concave lenses on both sides of the polymer film creates a surface that can be in optical contact with the adjacent films on either side and still effectively diffuse the light.

In another embodiment of the invention, concave lenses are present on the top surface and convex lenses are present on the bottom surface of the transparent polymeric film. The placement of concave lenses on the top side of the polymer film creates a surface that can be in optical contact with the adjacent films and still effectively diffuse the light. The placement of convex lenses on the bottom side of the polymer film creates stand off from other adjacent films providing the necessary air gap required for efficient diffusion by the lenses.

Preferably, the concave or convex lenses have an average frequency in any direction of between 4 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are most preferred. It has been shown that an average frequency of between 22 and 6 complex lenses provide efficient light diffusion and can be efficiently manufactured utilizing cast coated polymer against a randomly patterned roll.

The preferred form has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the diameter of the smaller lenses is preferably less than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 microns.

When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. Most preferred are the minor lenses having a width in the x and y direction between 3 and 8 microns. This range has been shown to create the most efficient diffusion.

Utilizing the form of the invention, the complex lenses preferably comprise polymers. Polymers are low in cost, can be easily formed and are optically clear. Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the concave or convex lenses on the form are semi-spherical meaning that the surface of each lenslet is a sector of a sphere, but not necessarily a hemisphere. This provides excellent even diffusion over the x y plane. The semi-spherical shaped lenses scatter the incident light uniformly, ideal for a backlit display application where the display area need to be lit uniformly.

In another embodiment of the invention, the concave or convex lenses on the form are aspherical meaning that width of the lenses differ in the x and y direction. This scatters light selectively over the x y plane. For example, a particular x y aspect ratio might produce an elliptical scattering pattern. This would be useful in the front of a LC display, spreading the light more in the horizontal direction than the vertical direction for increased viewing angle.

The convex or concave lenses on the form preferably have a height/diameter ratio of between 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of between 0.25 to 0.48. It has been proven that the most efficient diffusion occurs in this range.

The preferred process for making the complex lens form of the invention comprises the formation of surface asperities or roughness on the surface of the form and subsequent plating of the surface. The formation of surface asperities provides the desired frequency, size and shape of the lens and the subsequent plating provides the nodules that provides curvature to the lenses and the creation of the minor lenses. This method for the creation of the form provides a means to achieve a manufacturing process that is roll to roll, that is the form of the invention can be used to in a process to manufacture rolls of light diffuser. Rolls of light diffuser are typically low in cost and provide an effective means of providing many different sizes and shapes of light diffuser materials.

A process for providing asperities preferably comprises abrasive texturing. Abrasive texturing, that is texturing of a form by means of impinging a surface with abrasive materials, provides random texturing of a form which has been shown to provide excellent light diffusion properties. In a preferred embodiment of the invention, the abrasive texturing preferably comprises particles that are irregular in shape. By providing abrasive particles that are irregular in shape, the surface asperities are irregular in shape and more random in nature which leads to a light diffuser that is efficient and has a wide light diffusion cone.

In another preferred embodiment of the invention, the surface texturing preferably comprises particles with a spherical shape. By providing particles with a spherical shape, the surface asperities on the form tend to be more rounded compared to irregular particle formed surface asperities. Rounded complex lenses have been shown to provide excellent light diffusion, a greater surface area for the formation of minor lenses and can shape the light into a smaller light diffusion cone as compared to surface asperities formed utilizing irregular particles.

The surface texturing utilizing preferably comprises $Al_2CO_3$. $Al_2CO_3$ has been shown to provide irregular particle size and the ability to surface texture a metallic roller. Another preferred texturing material comprises silicone carbide. Silicone carbide is hard and thus tens to create complex lenses in the form that have a high aspect ratio. High aspect ratio complex lenses have been shown to provide a small light diffusion cone and can be utilized to improve the brightness of LC devices as most of the light will be focused on the viewers eye. Another preferred surface texturing material is glass. Glass is inexpensive and can be formed in spherical beads which tend to create surface textures that are rounded compared to particles that are irregular in shape. Rounded complex lenses have been shown to provide maximum surface area for the minor lenses of the invention thus allowing for maximum minor lens concentration compared to lenses are that are irregular in shape.

The particle size of the abrasive texturing preferably comprises particles with a mean diameter between 4 and 7,000 micrometers. Texturing particles with a mean diameter less that 2 micrometers have been shown to provide surface complex lenses sizes that are less that the wave length of light which can produce undesirable light interference patterns. Mean particle diameters greater than 7,000 micrometers have been shown to provide significant gaps between the lenses that result in unacceptably high amount of specular light transmission which results in uneven brightness on LC devices. The most preferred particle sizes for the particle abrasive texturing of the invention is between 100 and 1,000 micrometers. This particle size range has been shown to provide the most efficient complex lenses for the diffusion of visible light.

The preferred roughness average or Ra of the abrasive texturing is between 0.10 and 10.0 micrometers. Below 0.05 micrometers, the lenses are less than the wave length of visible light and can cause unwanted light interference patterns which tend to filter white light. Roughness average of the abrasive texturing above 12 micrometers does not provide additional light diffusion efficiency and therefore is not cost justified. The most preferred roughness average is between 0.5 and 4.0 micrometers. This most preferred roughness average range provide excellent light diffusion and provides for excellent polymer release from the form of the invention.

The plating process of the invention preferably comprises chrome plating. Chrome platting has been shown to provide the desirable nodule growth during the chrome platting process that creates the complex lenses. Further, chrome platting provides a hard, durable surface for the casting, molding or vacuum forming of polymer complex lenses. The chrome platting also provides a scratch resistant form that is durable during the handling of the form in manufacturing. Scratches in the form are undesirable as they tend to result in specular areas of light transmission. The preferred chrome platting process results in nodules formed around the surface texturing of the form. Chrome platting nodules are layers of chrome platting formed on the surface texture points. The nodules of the invention tend to round or smooth the texture points creating the curved lens shape of the invention. As the chrome layer thickness increases, the size of the nodules increases thus increasing the size of the complex lenses on the form.

The preferred chrome platting thickness is between 1 and 150 micrometers. Below 0.8 micrometers, the nodule growth on the surface asperities of the invention is insufficient to provide the complex lens geometry of the invention. Above 180 micrometers, the chrome tends to fill in the surface asperities of the invention resulting in simple lenses. The most preferred chrome layer thickness is between 2 and 75 micrometers. This chrome platting range as been shown to provide excellent complex lenses in the form, tends to smooth the roughness in the form which would result in undesirable specular light transmission and provides enough chrome to provide for polymer release.

Polymer sheet for the transparent polymeric film comprising a plurality of convex and/or concave complex lenses on a surface thereof are generally dimensionally stable, optically clear and contain a smooth surface. Biaxially oriented polymer sheets are preferred as they are thin and are higher in elastic modulus compared to cast coated polymer sheets. Biaxially oriented sheets are conveniently manufactured by coextrusion of the sheet, which may contain several layers, followed by biaxial orientation. Such biaxially oriented sheets are disclosed in, for example, U.S. Pat. No. 4,764,425.

Suitable classes of thermoplastic polymers for the transparent polymeric film include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Polyolefins particularly polypropylene, polyethylene, polymethylpentene, and mixtures thereof are preferred. Polyolefin copolymers, including copolymers of propylene and ethylene such as hexene, butene and octene are also preferred. Polypropylenes are most preferred because they are low in cost and have good strength and surface properties.

Preferred polyesters for the transparent polymeric film of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides for the transparent polymeric film include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof Copolymers of polyamides are also suitable continuous phase polymers. An example of a useful polycarbonate is bisphenol-A polycarbonate. Cellulosic esters suitable .for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda is preferably added to a polyester skin layer to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The diffuser sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The lenslet diffuser film may also be used in conjunction with another light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The diffuser sheet of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The lenslet diffuser film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n^*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.^*d$ since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a transparent polymeric film.

A chill roller is manufactured by a process including the steps of electroplating a layer of cooper onto the surface of a roller, and then-abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the lenslet diffuser film of the present invention can be used e.g. as a retroreflective member for a traffic sign. It can be used in a state applied to a car, a bicycle, person, etc.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

EXAMPLES

In this example, two complex light diffusion rollers (DF1 and DF2) were made by blasting a metallic roller surface and chrome platting the surface of the two rollers to create the complex lens pattern of the invention. The two rollers (DF1 and DF2) were then used to form visible light diffusers by melt casting polyolefin polymer onto the surface of the roller and subsequent transfer to a transparent polyester web material thereby forming a visible light diffuser with complex surface lenses. This example will show the utility of the complex lens form as it relates to visible light diffusion. Also included in the example is a comparison of prior art light diffusion materials comprising polymer beads coated in the acrylic matrix on a polyester web material.

Figure 1:
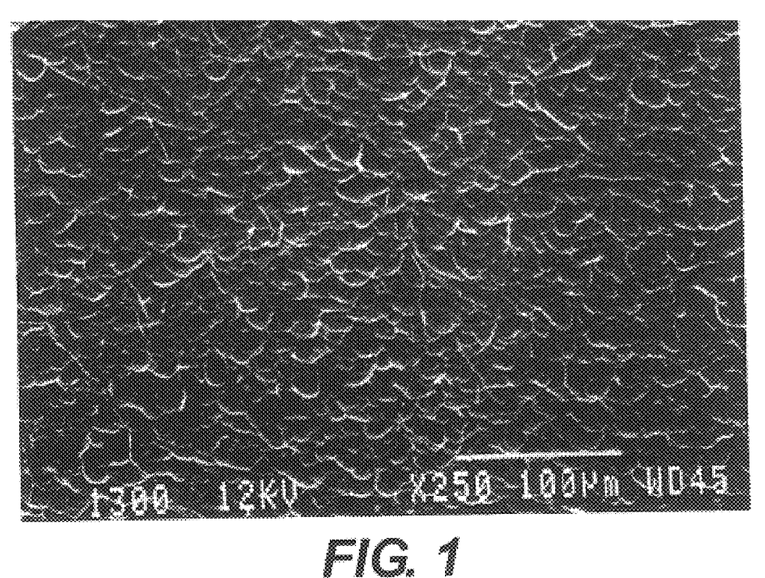
FIG. 1 is an image of the surface of DF1 metallic roller form of Example 1 of the present invention by an optical microscope (magnification: 500).

The complex lens patterned rollers (DF1 and DF2) were manufactured by grit texturing steel blanks then chrome plating. The steel blanks were ground to establish cylindricity to a surface finish of approximately 32 micrometers Ra. The DF1 roller was textured using US Standard Grit size 150 (122 micron average particle size) at pressure of 0.41 megapascal, roller rotation rate of 13 revolutions per minute and a nozzle feed rate of 2.4 centimeters per minute. The resulting surface had an average Ra of 1.18 micrometers, Rz of 7.66 micrometers and Pc(0.30)=295/centimeter. The surface texture measurements were performed using a Perthometer contact profilometer with a 2 um radius stylus and a 0.8 mm cut-off filter. The roller was then chromium electroplated using a conventional chrome plating system having a chromic acid concentration of 250 grams/liter and a chromic acid to sulfate radical ratio of 100 to 1 by weight. The DF1 roller was plated at a temperature of 49 degrees Celsius using 25 amps square decameter to a thickness of 6.4 micrometers. The resulting surface had an average Ra=0.97 micrometers, Rz=7.04 micrometers, and a Pc(0.30)=232 per centimeter. The image of DF1 is shown in FIG. 1 and the complex lens geometry of DF1 can be observed on the image.

Figure 2:
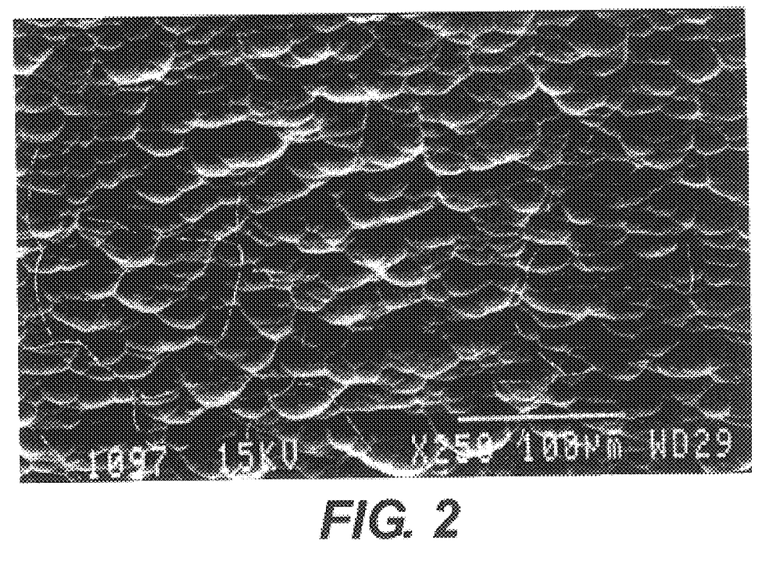
FIG. 2 is an image of the surface of DF2 metallic roller form of Example 1 of the present invention by an optical microscope (magnification: 500).

The DF2 roller was textured using US Standard Grit size 80 (266 micron average particle size) at pressure of 0.34 megapascal, roller rotation rate of 13 revolutions per minute and a nozzle feed rate of 2.4 centimeters per minute. The resulting surface had an average Ra of 1.93 um, Rz of 13.20 um and Pc(0.05)=280/centimeter. The roller was then chromium electroplated using a conventional chrome plating system having a chromic acid concentration of 250 grams/liter and a chromic acid to sulfate radical ratio of 100 to 1 by weight. The DF2 roller was plated at a temperature of 49 degrees Celsius using 39 amps square decameter to a thickness of 25.4 micrometers. The resulting surface had an average Ra=1.60 microns, Rz=10.6 microns, and a Pc(0.05)=167 per centimeter. The image of DF2 is shown in FIG. 2 and the complex lens geometry of DF2 can be observed on the image.

The two patterned chill roll (DF1 and DF2) were utilized to create light diffusion sheets by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 97.2%. The polyolefin cast coating coverage was 25.88 g/m². The structure of the cast coated light diffusion sheets of the invention was as follows, Formed Polyolefin Lenses
Transparent Polyester Base The two diffusion sheets containing formed polymer lenses from above (DF1 and DF2) and a prior polymer light diffuser containing 8 micrometers polymer beads in an acrylic binder layer coated on a polyester web material were measured for % light transmission, % diffuse light transmission, % specular light transmission and % diffuse reflectance.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention, control and prior art materials are listed in Table 1 below.

TABLE 1

| Sample | 1 Invention DF1 | 2 Invention (DF2) | 3 Control (Prior Art) |
|---|---|---|---|
| Total transmission measured at 500 nm | 89.0 | 90.6 | 66.7 |
| Diffuse transmission measured at 500 nm | 79.3 | 76.9 | 65.7 |
| Spectral transmission measured at 500 nm | 9.7 | 13.7 | 1.0 |
| Diffuse reflectance measured at 500 nm | 9.8 | 9.2 | 33.3 |

As the data above clearly indicates, complex polymer lenses formed on the surface of a transparent polymer provide excellent light diffusion and % transmission allowing for brighter liquid crystal display devices. The light transmission for the invention materials (DF1 and DF2) provides significantly higher light transmission compared to prior art light diffusion materials comprising polymer beads in a matrix. Higher light transmission results in improved LC device brightness. Integrating all of the measurements in Table 1, DF1 combined high total transmission with high diffuse light transmission. This created a film that masked the pattern of the light guide while allowing most of the light through the film to enable a brighter LC display. DF2 had a higher transmission value and lower diffuse transmission value than DF1 resulting in a brighter LC display which can be attributed to a smaller diffusion cone than DF1. For the control materials, most of the light exiting the film was diffuse thus masking the pattern of the light guide. Though the light exiting was almost totally diffuse, the total transmission measurement was low blocking light and creating an unacceptably dark display. Light through sample three was also wasted because of a 33% loss in reflected light energy.

Because both DF1 and DF2 were chromed steel rolls, they both provided excellent durability and LDPE release from the complex lens forms. The LDPE replicated both the DF1 and DF2 form by 93% of the original geometry allowing the complex lens geometry to be transferred from the form of the invention to the LDPE polymer. While the form of this example was directed toward extrusion cast coating of polyolefin polymer. The form of the invention can also be used as a polymer injection molding tool, embossing form, a vacuum forming tool or a stamping tool.

In addition, while this example was primarily directed toward the use of thermoplastic light diffusion materials for LC devices, the materials of the invention have value in other diffusion applications such as back light display, imaging elements containing a diffusion layer, a diffuser for specular home lighting and privacy screens, image capture diffusion lenses, wave guides and greenhouse light diffusion.

What is claimed is:

1. A form comprising a surface having a morphology of complex lenses wherein the surface asperities have an amplitude of between 1 and 40 micrometers, a spatial frequency of between 1 and 100 complex lenses per square millimeter, and between 1 and 40 minor lenses per major lens.

2. The form of claim 1 wherein said complex lenses are randomly spaced.

3. The form of claim 1 wherein said complex lenses are ordered.

4. The form of claim 1 wherein said surface asperities have an amplitude of between 3 and 20 micrometers.

5. The form of claim 1 wherein said surface asperities have a spatial frequency of between 15 and 70 complex lenses per square millimeter.

6. The form of claim 1 wherein said surface asperities have between 6 and 25 minor lenses per major lens.

7. The form of claim 1 wherein said form comprises a metallic roller bearing the asperities on the exterior surface thereof.

8. The form of claim 7 wherein said metallic roller is a chilled roller.

9. The form of claim 7 wherein said roller is chrome plated.

10. The form of claim 1 wherein said form comprises an plastic injection molding tool.

11. The form of claim 1 wherein said form comprises a hot embossing roller.

12. The form of claim 1 wherein said form comprises a vacuum form mold.

13. The form of claim 1 wherein said complex lenses have an average width in the x and y direction between 3 and 60 microns.

14. The form of claim 1 wherein said complex lenses comprising minor lenses wherein the diameter of the smaller lenses is on average less than 80% of the diameter of the major lens.

15. The form of claim 1 wherein said complex lenses are semi-spherical.

16. The form of claim 1 wherein said complex lenses are aspherical.

17. The form of claim 1 wherein said complex lenses have a height/diameter ratio of between 0.03 to 1.0.

18. The form of claim 1 wherein said complex lenses have a height/diameter ratio of between 0.25 to 0.48.

19. A process for making a form comprising a surface having a morphology of complex lenses comprising the steps of creating asperities on the surface of the form and plating the surface of the form to provide a metallic coating in the shape of the desired complex lenses.

20. The process of claim 19 wherein said asperities are formed by abrasive texturing.

21. The process of claim 20 wherein said abrasive texturing comprises particles with an irregular shape.

22. The process of claim 20 wherein said abrasive texturing employs particles with spherical shape.

23. The process of claim 20 wherein said abrasive texturing employs particles comprising $Al_2O_3$.

24. The process of claim 20 wherein said abrasive texturing employs particles comprising silicon carbide.

25. The process of claim 20 wherein said abrasive texturing employs particles comprising glass.

26. The process of claim 20 wherein said abrasive texturing employs particles with a mean diameter of between 4 and 7,000 micrometers.

27. The process of claim 20 wherein said abrasive texturing employs particles with a mean diameter of between 100 and 1,000 micrometers.

28. The process of claim 20 wherein said abrasive texturing particles have Ra of between 0.1 and 10.0 micrometers.

29. The process of claim 20 wherein said abrasive texturing particles have Ra of between 0.5 and 4.0 micrometers.

30. The process of claim 19 wherein said plating comprises chromium plating.

31. The process of claim 30 wherein said plating comprises nodules.

32. The process of claim 30 wherein said plating is carried out to a chromium layer thickness of between 1 and 150 micrometers.

33. The process of claim 30 wherein said plating is carried out to a chromium layer thickness of between 2 and 75 micrometers.

34. The process of claim 19 wherein said complex lenses comprise an amplitude of between 1 and 40 micrometers, a spatial frequency of between 1 and 100 complex lenses per square millimeter, and between 1 and 40 minor lenses per major lens.

35. The process of claim 19 wherein said complex lenses are randomly spaced.

36. The process of claim 19 wherein said complex lenses have an average width in the x and y direction between 3 and 60 microns.

37. The process of claim 19 wherein said complex lenses have a height/diameter ratio of between 0.03 to 1.0.

38. The process of claim 19 wherein said form comprises a metallic surface.

39. The process of claim 19 wherein said form comprises a metallic roller.

40. The process of claim 19 wherein said form comprises a plastic injection molding tool.

41. The process of claim 19 wherein said complex lenses are aspherical.

* * * * *